Figure 1:
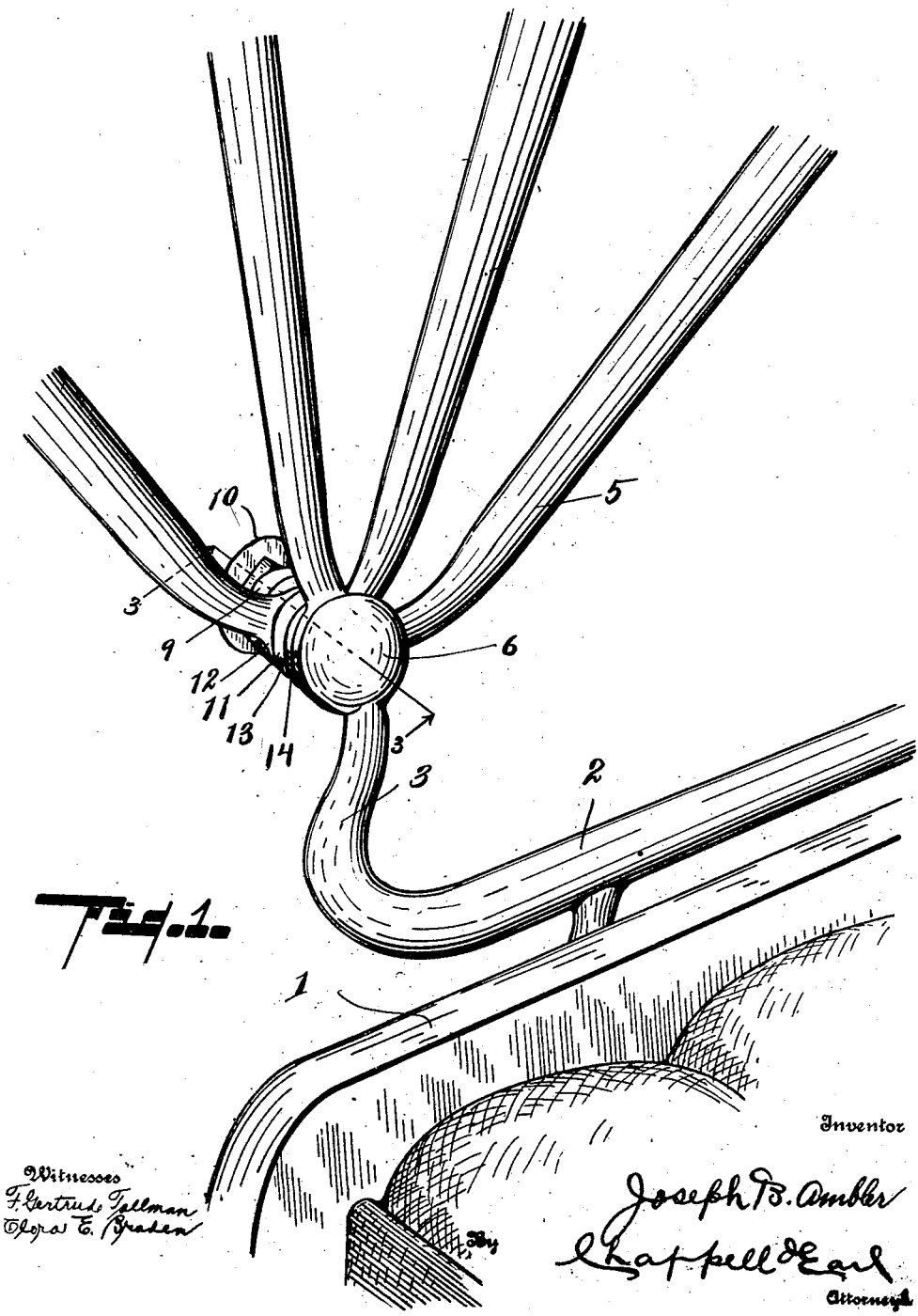

J. B. AMBLER.
CARRIAGE TOP.
APPLICATION FILED NOV. 15, 1909.

1,061,031.

Patented May 6, 1913.
2 SHEETS—SHEET 1.

Witnesses
F. Gertrude Tollman
Flora E. Braden

Inventor
Joseph B. Ambler
Chappell & Earl
Attorneys

J. B. AMBLER.
CARRIAGE TOP.
APPLICATION FILED NOV. 15, 1909.
1,061,031.
Patented May 6, 1913.
2 SHEETS—SHEET 2.
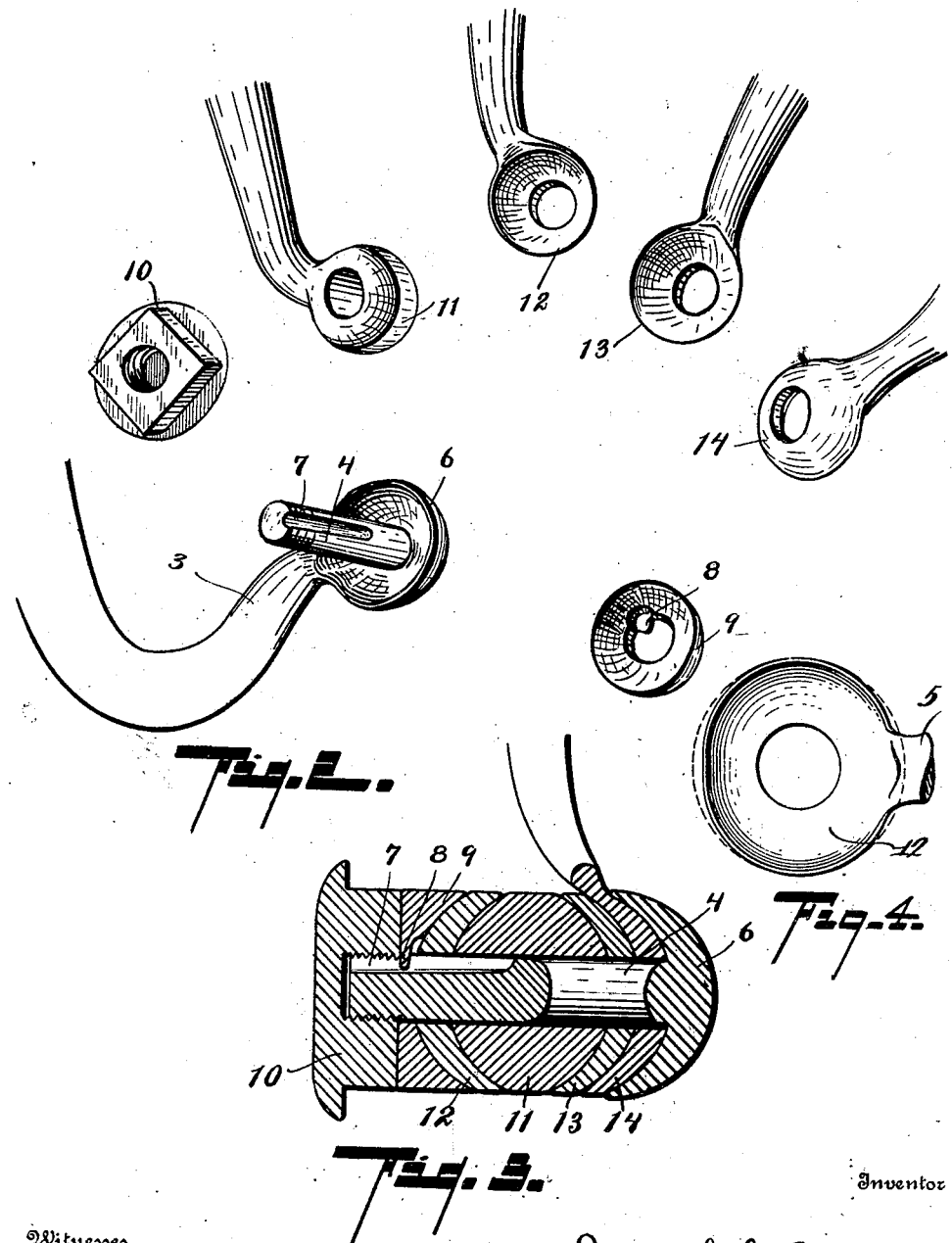

UNITED STATES PATENT OFFICE.

JOSEPH B. AMBLER, OF CADILLAC, MICHIGAN.

CARRIAGE-TOP.

1,061,031. Specification of Letters Patent. Patented May 6, 1913.

Application filed November 15, 1909. Serial No. 528,125.

*To all whom it may concern:*

Be it known that I, JOSEPH B. AMBLER, a citizen of the United States, residing at the city of Cadillac, county of Wexford, State of Michigan, have invented certain new and useful Improvements in Carriage-Tops, of which the following is a specification.

This invention relates to improvements in carriage tops.

The main objects of this invention are: First, to provide in a carriage top an improved bow support having a tight joint when the bows are extended, and, at the same time, one which adjusts freely when the bows are collapsed. Second, to provide in a carriage top an improved construction whereby the wear on the supporting stud and the stud-engaging members is largely overcome and the shearing strain on the studs is largely overcome.

Further objects, and objects relating to structural details, will definitely appear from the detailed description to follow.

I accomplish the objects of my invention by the devices and means described in the following specification.

The structure described constitutes one effective embodiment of my invention.

Other embodiments would be readily devised by those skilled in the art.

The invention is clearly defined and pointed out in the claims.

A structure constituting an effective and preferred embodiment of the features of my invention is clearly illustrated in the accompanying drawing, forming a part of this specification, in which:

Figure 1 is a detail perspective view of a structure embodying the features of my invention. Fig. 2 is a detail perspective view of the parts involving the features of my invention of the structure shown in Fig. 1 disassembled. Fig. 3 is an enlarged detail section, taken on a line corresponding to line 3—3 of Fig. 1, a portion of the stud being shown in full lines. Fig. 4 is an enlarged detail view of a joint member 12, showing the cam surface much exaggerated.

In the drawings, similar reference numerals refer to similar parts throughout the several views, and the sectional views are taken looking in the direction of the little arrows at the ends of the section lines.

Referring to the drawing, 1 represents the seat of a carriage, and 2 the seat rail, which is, in the structure illustrated, turned upwardly at 3 to support the stud 4 by which the carriage top bows 5 are carried. The structure illustrated is a four bow structure.

The stud 4 is provided with a head 6, integral with the seat rail 2, having a concavity on its inner engaging face. The face toward the seat is convex. The stud 4 is preferably provided with a longitudinal groove 7, which is engaged by the lug 8 of the concave washer 9, whereby turning of the washer is prevented. A capped nut 10 is threaded upon the stud.

The bows 5 are provided with joint members 11, 12, 13 and 14, perforated to receive the stud 4. The joint member 11, which is one of the intermediate members, is convex on both sides,—that is, double convex. The joint members 12, 13 and 14 are concavo-convex to coact with the member 11 and with the head 6 and washer 9 of the stud. The joint members 12, 13 and 14 are substantially the same form, but are offset on the bows at different angles to permit the collapsing of the bows together. At least one of the stud-engaging members for the bows is preferably a cam member, as shown in Fig. 4, and the bearing surface of the adjacent member is conformed thereto, so that, when the bows are erected, the stud-engaging members are tightened or clamped together upon the stud, thereby preventing rattling and movement of the members upon each other. This cam formation is shown in exaggerated form in Fig. 4, and may be the form of any joint member the adjacent member being conformed thereto. The joint members 11, 12, 13 and 14 are co-engaging members, because the convexity of each engages the concavity of the adjacent joint member and any thrust is taken up by the members themselves rather than upon the stud, so that the stud is not worn nor sheared and the joint thereby loosened.

The form I have illustrated and described is the form preferred, and I desire to claim it specifically and broadly as well.

My improved support is very strong and durable and possesses the advantage of being noiseless,—that is, the joint is tightened when the bows are extended so that there is no possibility of rattling, and, of course, this largely obviates the wear on the parts.

Having thus described my invention, what

I claim as new and desire to secure by Letters Patent is:

1. In a carriage top, the combination with the seat rail, of a longitudinally-grooved threaded stud having a concaved head integral with said rail; a nut for said stud; a concaved washer having a groove-engaging lug thereon; and bows with stud-engaging joint members, one of the stud-engaging members being double convex, the others being concavo-convex to coact therewith and with each other and the stud head and washer, one of said stud-engaging members being a cam member the contact surface of the adjacent member corresponding to said cam whereby a tightening action of the joint is secured by the extending of the bows.

2. In a carriage top, the combination with a longitudinally-grooved threaded stud having a concaved head associated with a suitable support; a nut for said stud; a concaved washer having a groove-engaging lug thereon; and bows with stud-engaging joint members, one of the stud-engaging members being double convex, the others being concavo-convex to coact therewith and with each other and the stud head and washer, one of said stud-engaging members being a cam member the contact surface of the adjacent member corresponding to said cam whereby a tightening action of the joint is secured by the extending of the bows.

3. In a carriage top, the combination with a longitudinally-grooved threaded stud having a concaved head associated with a suitable support; a nut for said stud; a concaved washer having a groove-engaging lug thereon; and bows with stud-engaging joint members, one of the stud-engaging members being double convex, the others being concavo-convex to coact therewith and with each other and the stud head and washer.

4. In a carriage top, the combination of a stud; bows; and stud-engaging joint members for said bows, at least one of said joint members being a cam member the contact surface of the adjacent member corresponding to said cam whereby a tightening or clamping action is secured when the bows are extended and loosened when said bows are collapsed; a washer adapted to engage said stud; and a screw nut to retain said parts.

In witness whereof, I have hereunto set my hand and seal in the presence of two witnesses.

JOSEPH B. AMBLER. [L. S.]

Witnesses:
WILLIAM E. SMITH,
D. E. MCINTYRE.